May 23, 1972　　　L. R. POE　　　3,664,696
LATCH ADJUSTER

Filed Jan. 15, 1971　　　　　　　　　　　　　2 Sheets-Sheet 1

INVENTOR.
LLOYD RICHARD POE
BY
　　Lyon+Lyon
ATTORNEYS

May 23, 1972   L. R. POE   3,664,696
LATCH ADJUSTER

Filed Jan. 15, 1971   2 Sheets-Sheet 2

INVENTOR.
LLOYD RICHARD POE
BY
Lyon & Lyon
ATTORNEYS

United States Patent Office 3,664,696
Patented May 23, 1972

3,664,696
LATCH ADJUSTER
Lloyd Richard Poe, Beverly Hills, Calif., assignor to Hartwell Corporation, Los Angeles, Calif.
Filed Jan. 15, 1971, Ser. No. 106,793
Int. Cl. E05c 5/00
U.S. Cl. 292—26    5 Claims

ABSTRACT OF THE DISCLOSURE

A latch adjuster or turnbuckle for flush type latches installed in aircraft, the adjuster including an adjusting member which is provided with opposed screwthreads, is square in cross section and is so mounted that each of its sides may occupy a position flush with the surrounding surface of the aircraft; each side being provided with tool receiving recesses accessible from the exterior of the aircraft for turning the adjusting member ninety degrees in either direction to expose a flanking side. Yieldable means engages the adjusting member to retain a side in its flush position.

BACKGROUND OF THE INVENTION

This invention has particular application in conjunction with flush latches as used on aircraft, but is not limited thereto. By way of example, many aircraft use a "clamshell" type of cowling consisting of two cowl doors curved around the lower half of a cylindrical engine to provide access for maintenance. The doors are hinged at their distal sides and are joined by a set of latches. These latches are intended to be subject to hoop tension and each latch must carry its share of the load, and therefore, must be provided with adjusting means. As presently designed, the adjusting means is only accessible when the cowl doors are open. As a consequence, it is necessary to adjust the latches by trial and error with repeated opening and closing of the cowl doors to recheck the adjustments, as the adjustment of one latch often affects the adjustment of the other latches.

Samples of draw latches capable of adjustment, when separated, are found in the following patents: 2,712,955; 2,896,751; 2,832,446; 2,904,141; 2,894,777; 3,318,624.

SUMMARY OF THE INVENTION

This invention provides an effective solution to the problem of latch adjustment, particularly multiple latch adjustment, and is summarized in the following objects:

First, to provide a latch adjuster which is exposed for external engagement and occupies a normal position essentially flush with the surrounding exposed surface so as to cause minimal disturbance to air flowing over the surface.

Second, the provide a latch adjuster in the form of a turnbuckle wherein the adjustment member is polygonal in cross section and arranged for rotation so that each side may be presented flush with the surrounding surface; each side having sockets or slots dimensioned to receive a tool such as a screwdriver and arranged so that for all positions of the latch adjuster during its movement from one flush position to the next in either direction, at least one slot is exposed and available for turning the adjuster, thereby permitting complete adjustment from the exterior of an aircraft on which the latch is mounted.

Third, to provide a latch adjuster which may be incorporated in the majority of the flush latches disclosed in the above listed patents by appropriate modification of the latching lever or the keeper mechanism.

Figure 1:
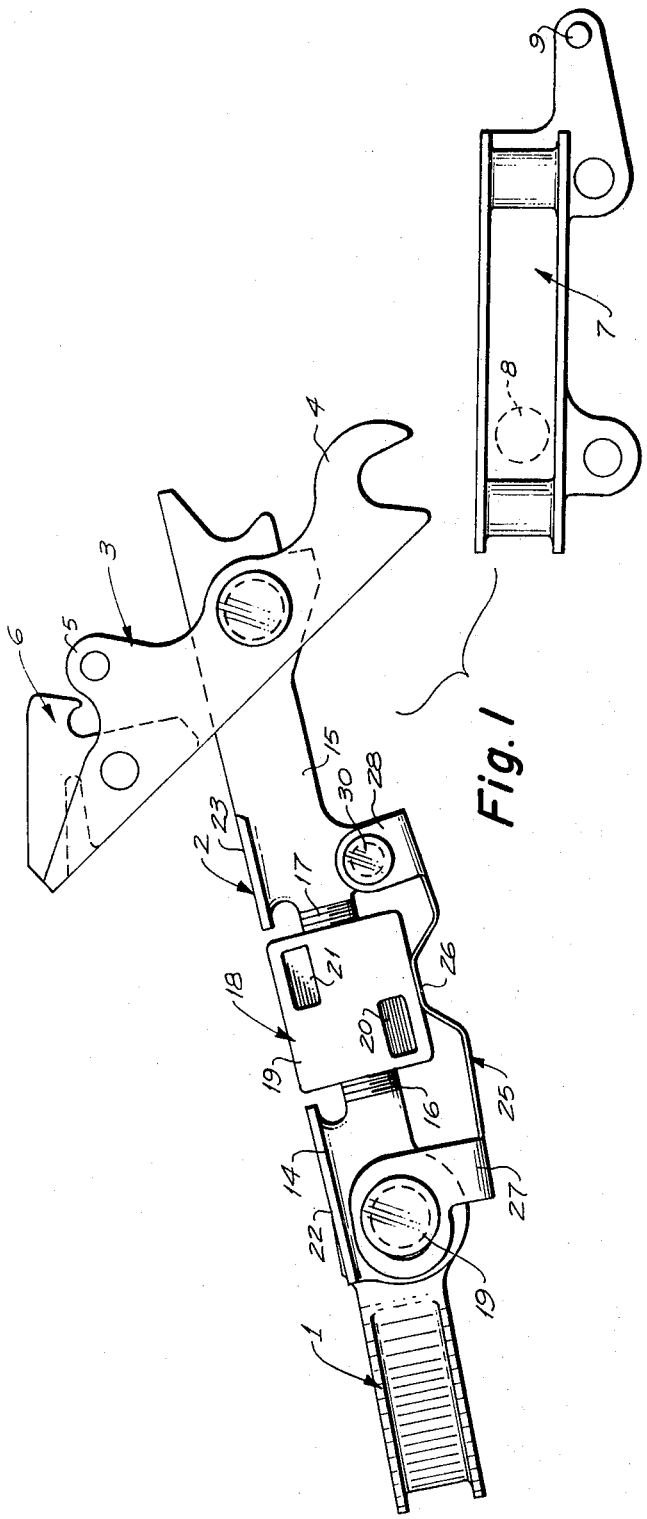
FIG. 1 is a side view of an otherwise conventional flush latch which has been modified to incorporate the latch adjuster, the latch being indicated in its open position.

A typical flush latch for which the latch adjuster is adapted includes a mounting member 1, secured to a door structure of an aircraft, such as a cowl door. A link lever 2 is pivotally connected to the mounting member 1. In the exercise of the present invention, the link lever is modified to incorporate the latch adjuster and will be described hereinafter. A handle lever 3 is pivotally connected to the link lever and includes a catch arm 4 and a handle arm 5. The handle arm may be provided with a trigger lever 6. The handle lever and trigger lever are adapted to engage a mounting structure 7, having a latching pin 8 and a trigger lever locking pin 9.

Figure 2:
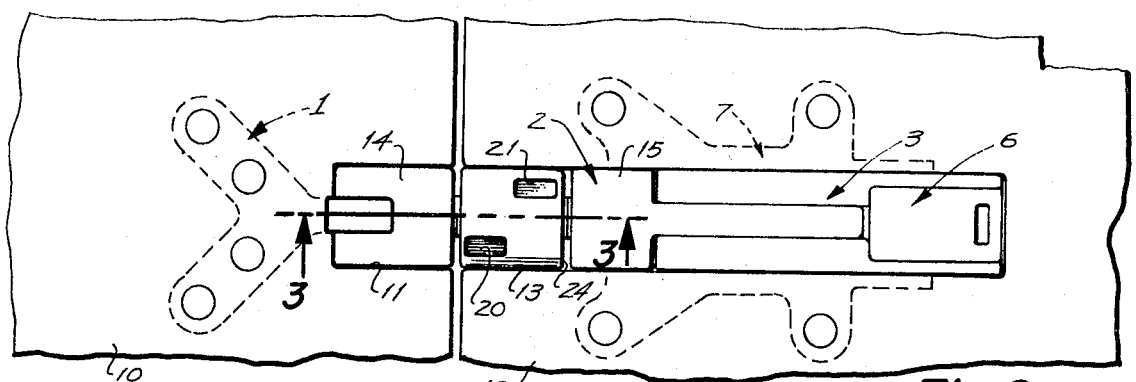
FIG. 2 is a fragmentary elevational view of a cowling and adjacent portion of a fuselage, showing a flush latch modified to incorporate the latch adjuster and mounted in a cowling and adjacent fuselage in its closed or latched position.

As indicated previously, the mounting member 1 is mounted in a door, such as a cowling door 10, as indicated in FIG. 2, which is provided with a slot 11 accommodating a portion of the link lever 2. The adjacent portion of the aircraft skin, designated 12, is provided with an aligned slot 13 which accommodates the link lever 2, handle lever 3 and trigger lever 6, the mounting structure 7 underlying the slot.

In the exercise of the present invention, the link lever 2 is divided to form an attached component 14 and an extended component 15, the latter receiving the handle lever 3. The confronting ends of the components 14 and 15 are provided with coaxially disposed screwthreaded stems 16 and 17, the screwthreaded stems being of opposed pitch.

Fitted on the stems 16 and 17 by means of a correspondingly screwthreaded bore is a latch adjuster block 18. In the preferred structure, the latch adjuster block 18 is provided with four flat sides 19, each of which is provided with a pair of tool reeciving slots 20 and 21 located in diagonally opposed corners.

Figure 3:
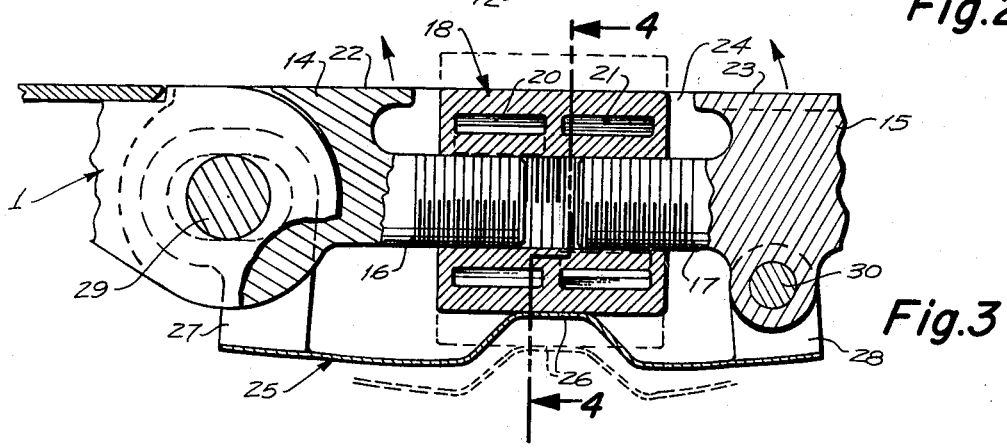
FIG. 3 is an enlarged fragmentary sectional view thereof, taken through 3—3 of FIG. 2, showing particularly the latch adjuster.
Figures 4, 5:
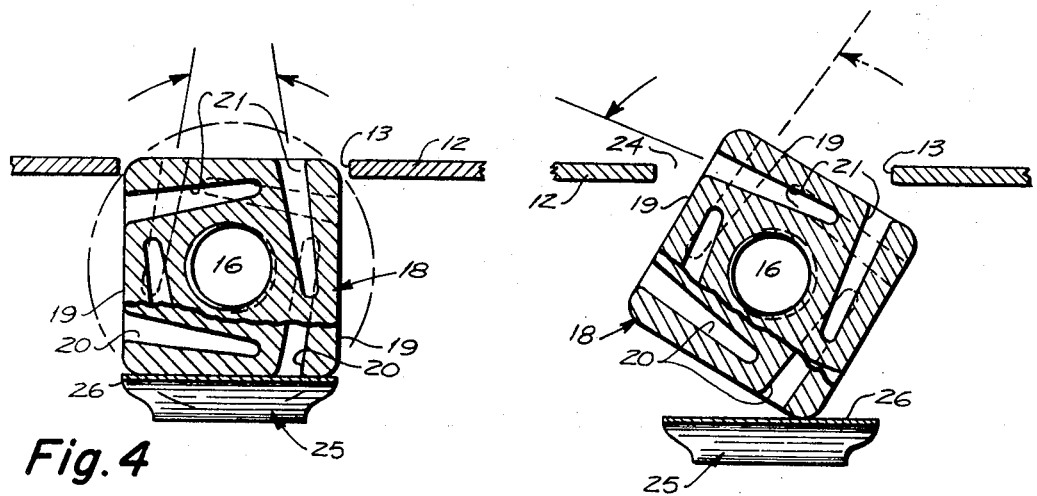
FIG. 4 is a transverse sectional view, taken through 4—4 of FIG. 3, showing the latch adjuster in its normal or flush position.
FIG. 5 is a sectional view, similar to FIG. 4, showing the adjuster in the process of being moved from one position to another.

When the latch structure is in its locked position, the screwthreaded stems 16 and 17 are disposed parallel with the surface of the aircraft and cowling, or nearly so if the surface is curved. The attached component 14 is provided with a portion 22 which is flush with the aircraft surface when the latch is secured. Similarly, the extended component 15 is provided with a flush portion 23. Also, the handle lever 3 and trigger lever 6 also include portions which when the latch is secured are flush with the surface of the aircraft. The confronting edges of the flush portions 22 and 23 and the portion of the slot 13 continuing alongside the flush portion 23 form a rectangular slot 24 which receives the latch adjuster block 18. The dimensions of the latch adjuster block are such that any side thereof may occupy a position flush with the surface of the aircraft, as indicated particularly in FIGS. 3 and 4.

In order to retain the latch block so that a selected side 19 thereof is in its flush position, the latch adjuster block 18 is engaged by a retainer spring 25 which includes a raised portion 26 engaging the opposite or inner side of the latch adjuster block. The extremities of the retainer spring 25 are provided with mounting yokes 27 and 28. The mounting yoke 27 is retained by a pin 29, forming a part of the hinge connection between the mounting member 1 and the attached component 14 of the link lever 2. The other mounting yoke 28 is attached to a pin 30, extending through an appropriate boss at the under or inner side of the extended component 15.

Operation of the latch adjuster is as follows:

The tool receiving slots are preferably shaped to receive the end of a screwdriver and are preferably arranged in two sets, each slot extends from a surface of the block into the space between the screwthreaded bore and a side of the block. Usually, the block may be turned in one direction by using one set of slots and the other direction by using the other set of slots. That is, the final movement in either direction is accomplished by the upward thrust of the retainer spring 25. However, should the force of the spring be insufficient to complete a ninety degree movement of the block, a slot is always available to receive a screwdriver for this purpose.

Figure 6:
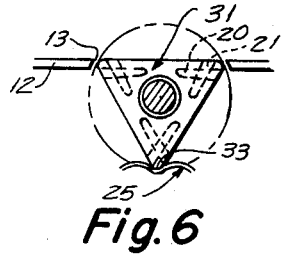
FIG. 6 is a reduced view, similar to FIG. 4, showing a modification of the latch adjuster, having a reduced number of sides.
Figure 7:
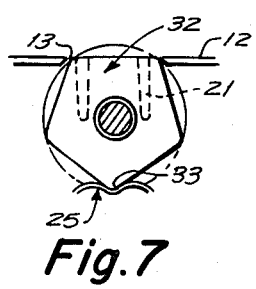
FIG. 7 is a similar view, showing the latch adjuster having an increased number of sides.

While a block having four sides is preferred, it is possible to utilize a block, designated 31, having three sides, as indicated in FIG. 6, or a block, designated 32, having five sides, as indicated in FIG. 7. If the latch adjuster block is provided with an odd number of sides, the raised portion 26 of the retainer spring 25 may be provided with a retaining depression 33. Adjustment of the load on the latch is, of course, made when the latch is in its closed position, flush with the surface of the aircraft. If several flush latches are used, it is possible to loosen or tighten the series of latches until the latches are exerting substantially equal force. It is essential to assure that the relative loads are as nearly equal as possible; a special tool having a torque indicator may be used.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A latch adjuster for a flush latch intended for securing a door in flush condition with respect to a surrounding surface, wherein the latch includes a divided latch lever having opposed screwthreaded stems, and the surrounding surface is provided with an aperture exposing the screwthreaded stems, said latch adjuster comprising:
   (a) an adjuster block receiving the screwthreaded stems in coaxial relation and rotatable to extend or retract the stems;
   (b) said adjuster block forming a regular polygon in cross section and its axis positioned to expose any selected side in the aperture and flush with the surrounding surface;
   (c) tool receiving sockets in each side of the adjuster block positioned to permit a tool engaging exposed sockets to turn the adjuster block until a succeeding side is moved into flush relation with the surrounding surface;
   (d) and yieldable means retaining the adjuster block in position with a side flush with the surrounding surface.

2. A latch adjuster, as defined in claim 1, wherein:
   (a) the tool sockets are disposed in axially displaced sets for sequential engagement to turn the adjuster block through the angle between adjacent sides.

3. An externally accessible adjuster for flush latches, comprising:
   (a) a divided latch lever having opposed screwthreaded stems and adjacent portions disposed flush with a surrounding surface when the latch is secured, the flush portions defining therebetween an access opening;
   (b) an adjuster block receiving the screwthreaded stems to extent or retract the latch lever, the adjuster block being a regular polygon in cross section and fitted in the access opening between the flush portions of the latch lever to place any of its sides flush therewith;
   (c) tool receiving sockets in each side of the adjuster block externally engageable to turn the adjusted block so as to present any selected side thereof in a flush position and effect corresponding extension or retraction of the latch lever;
   (d) and yieldable means engaging the opposite side of the adjuster block and tending to hold a side of the adjuster block in its flush position.

4. An adjuster arranged for disposition in an aperture and in flush relation to a surrounding surface, the adjuster comprising:
   (a) a pair of opposed screwthreaded stems disposed within the aperture in essentially parallel relation to the surrounding surface;
   (b) an adjuster block receiving the stems and rotatable to effect relative extension or retraction of the stems, the adjuster block being in the form of a regular polygon in cross section and positioned to place any of its sides in flush relation to the surrounding surface;
   (c) means formed in each side of the adjuster block and externally accessible through the aperture for rotating the adjuster to place succeeding sides flush with the surrounding surface.

5. An adjuster, as defined in claim 4, wherein:
   (a) the rotating means are tool receiving sockets formed in each side of the adjuster block.

References Cited
UNITED STATES PATENTS

| 732,178 | 6/1903 | Esser | 151—50 |
| 2,832,446 | 4/1958 | Smith | 287—189.35 |
| 311,716 | 2/1885 | Beecher | 287—60 |
| 2,904,141 | 9/1959 | Hendricks | 292—113 X |

ROBERT L. WOLFE, Primary Examiner

U.S. Cl. X.R.

292—113, DIG. 31, DIG. 66